(12) United States Patent
Kaltenborn et al.

(10) Patent No.: US 10,147,563 B2
(45) Date of Patent: Dec. 4, 2018

(54) ON-LOAD TAP CHANGER ACCORDING TO THE REACTOR SWITCHING PRINCIPLE

(71) Applicant: Maschinenfabrik Reinhausen GmbH, Regensburg (DE)

(72) Inventors: Uwe Kaltenborn, Regensburg (DE); Alfred Bieringer, Geiselhoering (DE); Christian Hammer, Regensburg (DE); Christian Pircher, Lappersdorf (DE); Andreas Sachsenhauser, Mallersdorf-Pfaffenberg (DE); Thomas Schuster, Regensburg (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 0 days.

(21) Appl. No.: 15/104,762

(22) PCT Filed: Jan. 12, 2015

(86) PCT No.: PCT/EP2015/050376
§ 371 (c)(1),
(2) Date: Jun. 15, 2016

(87) PCT Pub. No.: WO2015/113800
PCT Pub. Date: Aug. 6, 2015

(65) Prior Publication Data
US 2016/0329168 A1    Nov. 10, 2016

(30) Foreign Application Priority Data

Jan. 28, 2014  (DE) .................. 10 2014 100 949

(51) Int. Cl.
*H01F 27/02* (2006.01)
*H01H 9/00* (2006.01)
*H01F 27/08* (2006.01)
*H01F 27/06* (2006.01)
*H01F 29/02* (2006.01)
(Continued)

(52) U.S. Cl.
CPC .......... *H01H 9/0044* (2013.01); *H01F 27/02* (2013.01); *H01F 27/06* (2013.01); *H01F 27/08* (2013.01); *H01F 29/02* (2013.01); *H01F 29/025* (2013.01); *H01F 29/04* (2013.01); *H02P 13/06* (2013.01)

(58) Field of Classification Search
CPC ............................................ H01F 27/00–27/36
USPC ...................... 336/55–62, 180–184, 220–223
See application file for complete search history.

(56) References Cited

U.S. PATENT DOCUMENTS

| 3,175,148 A | 3/1965 | Swoish | |
| 3,472,981 A * | 10/1969 | Urbanek | ............... H01F 29/025 200/61.04 |

(Continued)

FOREIGN PATENT DOCUMENTS

| DE | 102008032375 A1 * | 1/2009 | ......... H01F 27/105 |
| DE | 202010011522 U | 1/2012 | |
| DE | 102012101988 A | 9/2013 | |

*Primary Examiner* — Tuyen Nguyen
(74) *Attorney, Agent, or Firm* — Andrew Wilford

(57) ABSTRACT

The invention relates to an on-load tap changer (2) according to the reactor switching principle for uninterrupted load switching between different tap windings of a tapped transformer (1), comprising: —an inductor (3) which is designed as an inductive transition reactance; —the inductor (3) being part of the on-load tap changer (2).

6 Claims, 7 Drawing Sheets

(51) Int. Cl.
*H01F 29/04* (2006.01)
*H02P 13/06* (2006.01)

(56) References Cited

U.S. PATENT DOCUMENTS

| | | | | |
|---|---|---|---|---|
| 3,493,847 | A * | 2/1970 | Hyde | H01F 29/04 307/131 |
| 3,720,867 | A * | 3/1973 | Rathbun | H01F 27/402 218/118 |
| 3,818,400 | A * | 6/1974 | Linnert | H01F 27/002 336/105 |
| 4,201,938 | A * | 5/1980 | Neumann | H01F 29/04 323/343 |
| 9,355,772 | B2 * | 5/2016 | Navarro | H01F 29/025 |
| 2004/0070359 | A1 * | 4/2004 | Dohnal | G05F 1/147 318/656 |
| 2009/0140705 | A1 * | 6/2009 | Dohnal | G05F 1/20 323/258 |

* cited by examiner

ON-LOAD TAP CHANGER ACCORDING TO THE REACTOR SWITCHING PRINCIPLE

CROSS REFERENCE TO RELATED APPLICATIONS

This application is the US-national stage of PCT application PCT/EP2015/050376 filed 12 Jan. 2015 and claiming the priority of German patent application 102014100949.5 itself filed 28 Jan. 2014.

CROSS REFERENCE TO RELATED APPLICATIONS

This application is the US-national stage of PCT application PCT/EP2015/050376 filed 12 Jan. 2015 and claiming the priority of German patent application 102014100949.5 itself filed 28 Jan. 2014.

FIELD OF THE INVENTION

The invention relates to an on-load tap changer according to the reactor switching principle for uninterrupted load changeover between different winding taps of a tapped transformer.

BACKGROUND OF THE INVENTION

A regulating transformer with a tap changer is known from U.S. Pat. No. 3,175,148 A. The transformer has a main winding and a regulating winding for each phase. In addition, associated with each phase is a choke (preventive autotransformer) that is used as a switching inductance from the tap changer, which is separately arranged outside at the regulating transformer, during the switching-over processes. The three switching inductances of the three phases are on the upper yoke of the main and regulating windings.

Since the chokes are directly at the yoke, in the case of arrangement of the tap changer on the high-voltage side, thus at the high-voltage potential, these chokes have to be particularly well insulated relative to the transformer yoke at ground potential. This has a significant effect on production costs of chokes of that kind. The connecting of the chokes with the respective tap changers is in that case complicated and similarly has to be very well insulated relative to ground potential.

OBJECT OF THE INVENTION

It is an object of the invention to create an on-load tap changer according to the reactor switching principle with the help of which the chokes can be favorably produced, are of simple construction and can be connected in simple manner with the on-load tap changer.

SUMMARY OF THE INVENTION

This object is fulfilled by an on-load tap changer according to the reactor switching principle for uninterrupted load changeover between different winding taps of a tapped transformer, comprising:
a choke constructed as an inductive switching inductance; wherein the choke is a component of the on-load tap changer or integrated in the on-load tap changer.

Since the choke that can be, for example, a coil or an inductance, is a component of the on-load tap changer and not of the windings or of the transformer yoke, this needs less insulation, i.e. with fewer layers of insulating paper on the windings, relative to ground potential. As a result, production of the chokes is simplified and costs are thereby reduced. Moreover, the connection, particularly the electrical connecting of the choke with the on-load tap changer, is less complicated, since the spacing of the two parts from one another is reduced.

The choke can be constructed in any desired mode and manner, for example can comprise one winding or two or three windings that is or are fastened to the iron core that is adapted to that purpose, with a yoke.

The on-load tap changer can be constructed in any desired mode and manner according to requirements and, for example, comprise at least one additional choke or more chokes and/or be conceived for single-phase, two-phase or three-phase applications. In the case of more than one phase, at least one choke is provided for each phase.

It can be provided that the on-load tap changer is a load selector constructed in any desired mode and manner and comprise, for example, vacuum interrupters or simple switching contacts in oil for switching-over under load.

Provision can be made that the choke is at an upper end or at a lower end of the load selector.

The arrangement can be executed in any desired mode and manner, for example by of mounts or by the iron core of the choke.

It can be provided that the on-load tap changer is a combination of load-changeover switch and selector.

The load-changeover switch can be constructed in any desired mode and manner and comprise, for example, vacuum interrupters or simple switch contacts.

The selector can be constructed in any desired mode and manner, for example with or without a preselector and/or as a linear selector or rotary selector.

It can be provided that the choke is at the upper end or at a lower end of the load changeover switch and/or the choke is at the upper end or at a lower end of the selector.

The arrangement can be realized in any desired mode and manner, for example by mounts or the iron core of the choke.

Provision can be made for the load-changeover switch and the selector to be connected by an iron core of the choke and the choke to be arranged at the iron core between the load-changeover switch and selector.

It can be provided that the on-load tap changer is or can be arranged at an upper part of a transformer housing.

It can be provided that the on-load tap changer is or can be arranged on an insulating foot at a lower part of a transformer housing. The insulating foot can be realized in any desired mode and manner, for example as a cylinder, frame or block, and/or be produced from glass-fiber reinforced plastic, a hard-paper cylinder and/or wood.

It can be provided that the on-load tap changer and the choke are connected in such a way that the two have the same voltage potential relative to ground potential.

It can be provided that the on-load tap changer is or can be used in a tapped transformer.

BRIEF DESCRIPTION OF THE DRAWING

The invention and advantages thereof are described in more detail in the following with reference to the accompanying drawings, in which.

Figure 1:
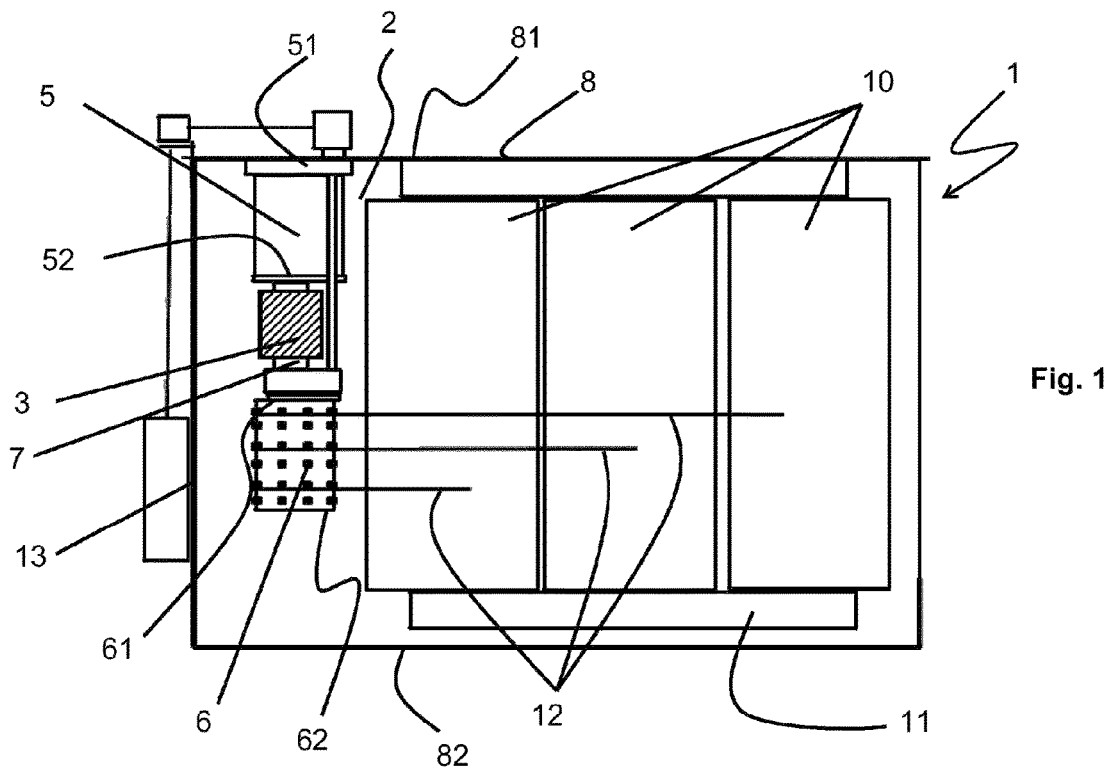
FIG. 1 shows a first embodiment of a tapped transformer with an on-load tap changer.

Identical reference numerals are used for the same or equivalent elements of the invention. Moreover, for the sake of clarity only those reference numerals are illustrated in the individual figures that are required for description of the respective figure. The illustrated embodiments represent merely examples of how the on-load tap changer according to the invention and in accordance with the reactor switching principle can be constructed and thus do not represent a definitive limitation of the invention.

SPECIFIC DESCRIPTION OF THE INVENTION

FIG. 1 shows a tapped transformer 1 with an on-load tap changer 2, which is in the interior thereof, for uninterrupted load changeover between different winding taps. The on-load tap changer 2 comprises a load-changeover switch 5 and a selector 6. Three windings 10, which are fastened to a transformer yoke 11, are in the interior of the tapped transformer 1, thus in the transformer housing 8. The windings are connected with the on-load tap changer 2 by individual lines 12. The on-load tap changer 2 is fastened to the cover or upper part 81 of the transformer housing 8. In the embodiment illustrated here, the on-load tap changer 2 is operated by a motor drive 13 arranged externally on the transformer housing 8. An insulating liquid such as, for example, oil or ester is present in the interior of the tapped transformer 1. However, the tapped transformer 1 can also be constructed as a so-called dry transformer in which air serves as insulating medium.

The iron core 7 is between the load-changeover switch 5 and the selector 6, thus at the lower end of the load-changeover switch 52. The iron core 7 connects the load-changeover switch 52 and the selector 6. A choke 3 constructed as a coil is on this iron core 7. This choke 3 serves as inductive switching inductance for the on-load tap changer 2, in this embodiment the load-changeover switch 5. Depending on the requirements of the on-load tap changer 2, the choke 3 can comprise one, two or three windings fastened to the iron core 7 that is adapted to that purpose.

Figure 2:
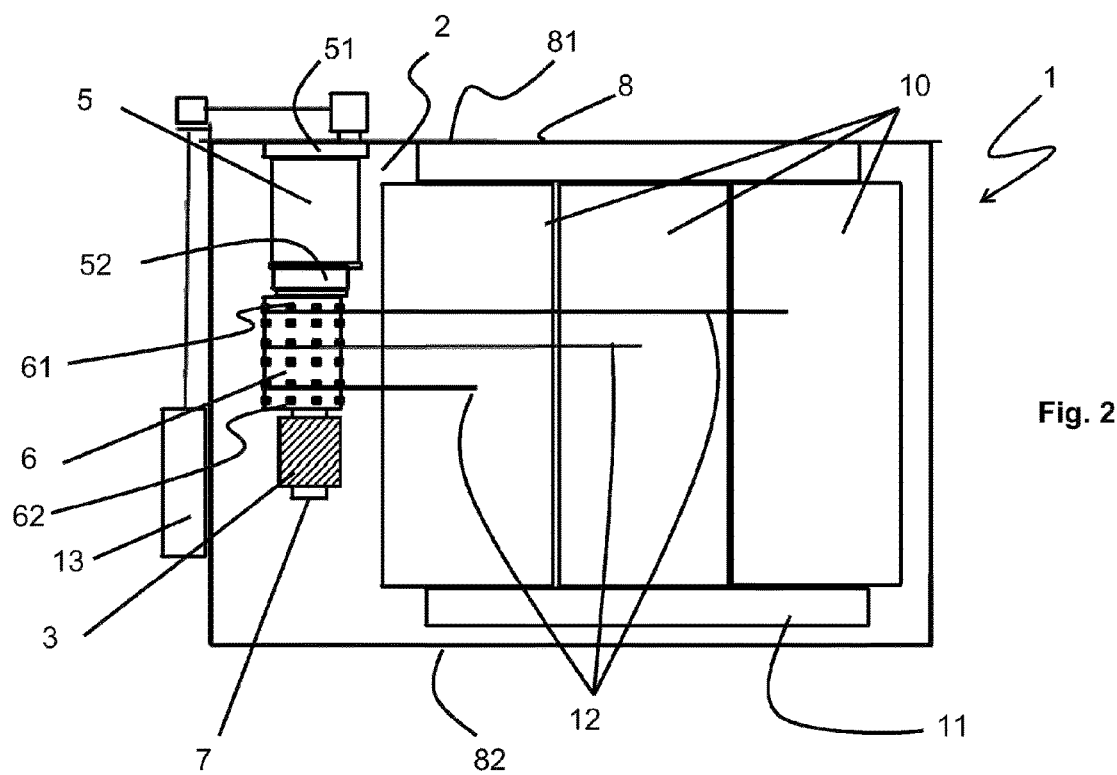
FIG. 2 shows a second embodiment of a tapped transformer with an on-load tap changer.

FIG. 2 shows a second embodiment in which the choke 3 and the iron core 7 are directly at a lower end 62 of the selector 6. However, the choke 3 can also be fastened to an upper end 51 of the load-changeover switch 5 (not illustrated here).

Figure 3:
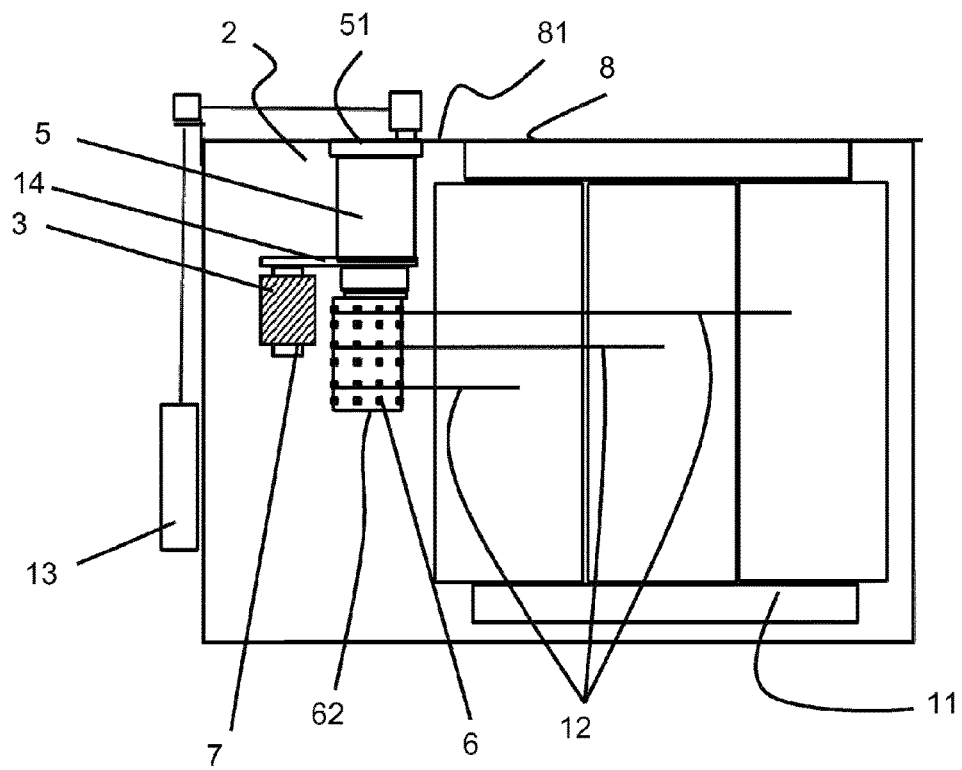
FIG. 3 shows a third embodiment of a tapped transformer with an on-load tap changer.

FIG. 3 shows a third embodiment in which the choke 3 and the yoke 7 are mounted laterally on the on-load tap changer 2 by a support bracket 14.

Figure 4:
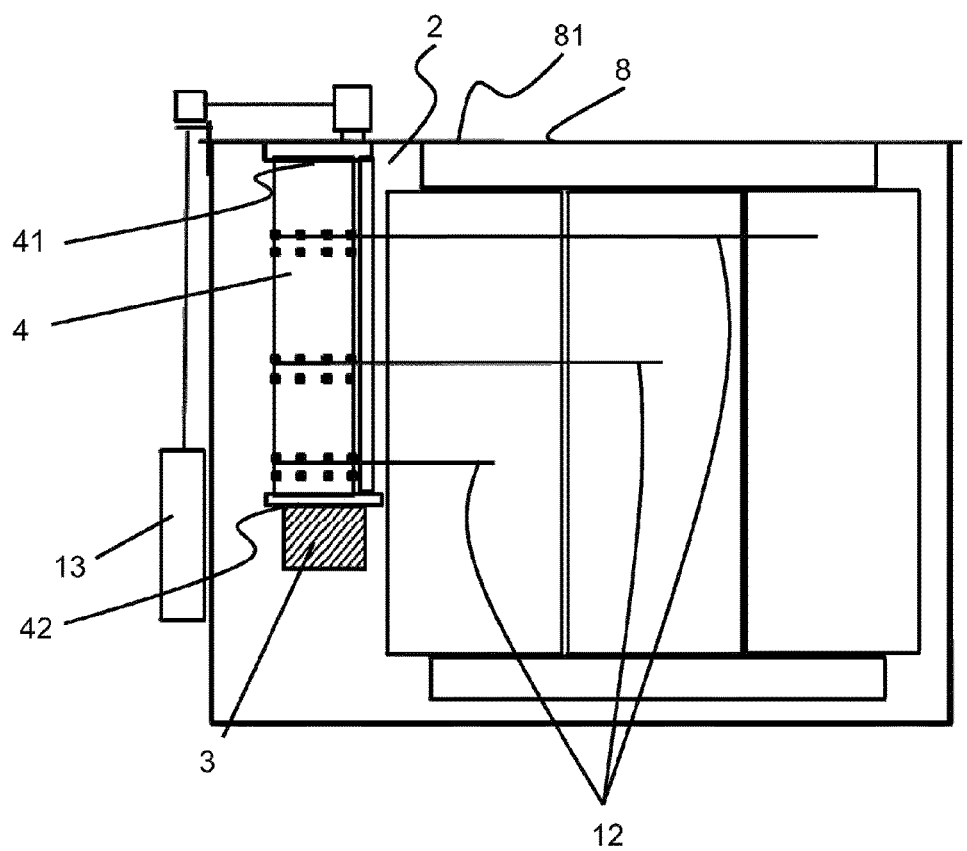
FIG. 4 shows a fourth embodiment of a tapped transformer with an on-load tap changer.

FIG. 4 shows a fourth embodiment in which the on-load tap changer 2 is a load selector 4. The load selector 4 is fastened to the upper part or cover 81 of the transformer housing 8. The choke 3 is at the lower end 42 of the load selector 4.

Figure 5:
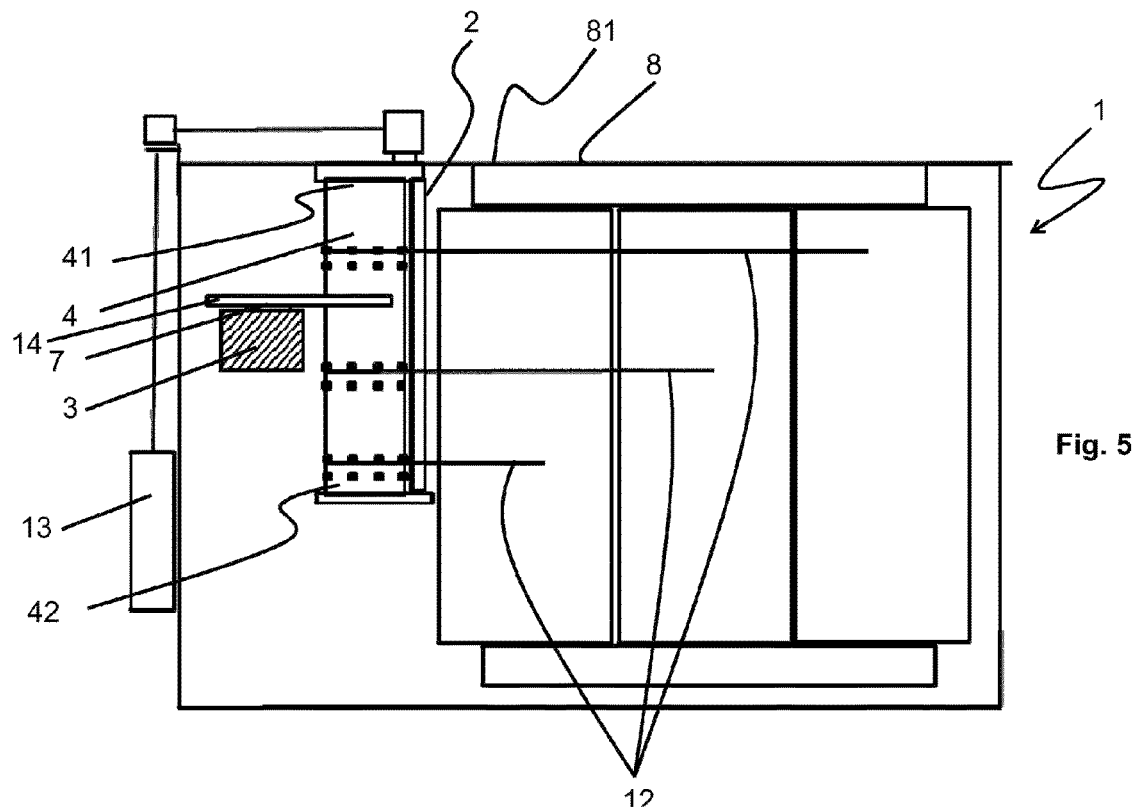
FIG. 5 shows a fifth embodiment of a tapped transformer with an on-load tap changer.

FIG. 5 shows a fifth embodiment in which a three-phase choke 3 is mounted laterally on the on-load tap changer 2, here constructed as a load selector 4, by a support bracket 14. However, the choke 3 can also be fastened at the upper end 41 of the load selector 4 (not illustrated here).

Figure 6:
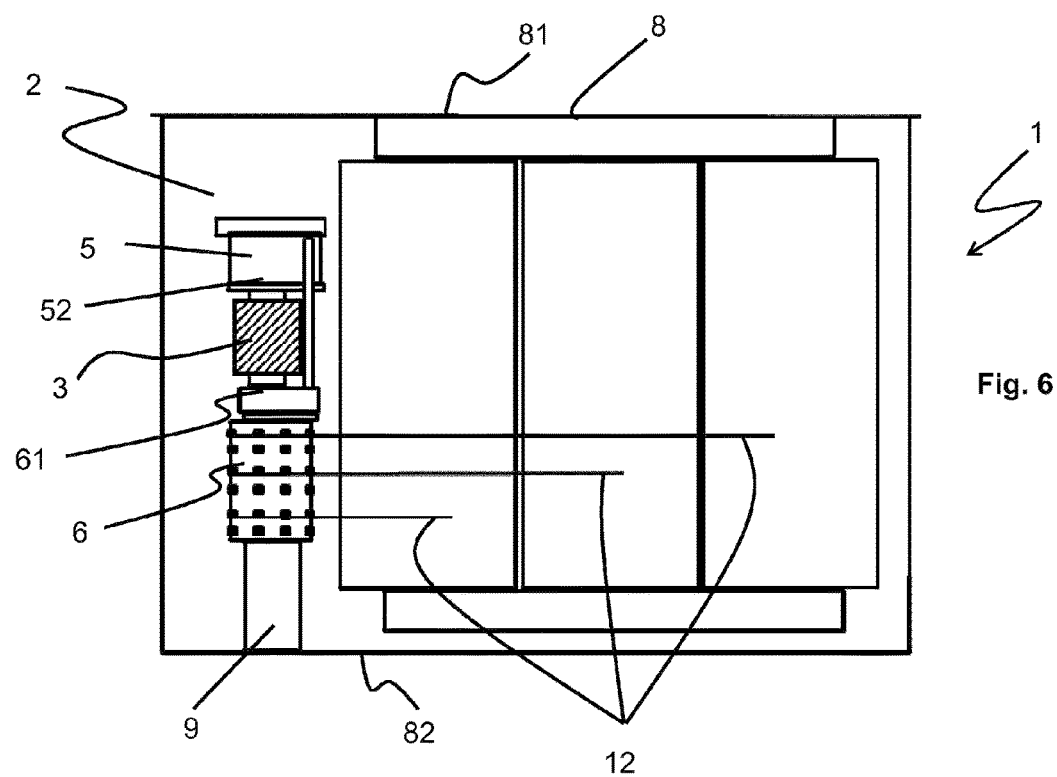
FIG. 6 shows a sixth embodiment of a tapped transformer with an on-load tap changer.

FIG. 6 shows a sixth embodiment in which the on-load tap changer 2 stands on an insulating foot 9 arranged at the lower part 82 (base) of the transformer housing 8. In that case the choke 3 is between the load-changeover switch 5 and the selector 6. Since the on-load tap changer 2 is no longer fastened by the load-changeover switch 5 to the upper part 81 of the transformer housing 8, which lies at ground potential, and thus no longer has to be insulated relative thereto, the load-changeover switch 5 can be of particularly short construction.

Figure 7:
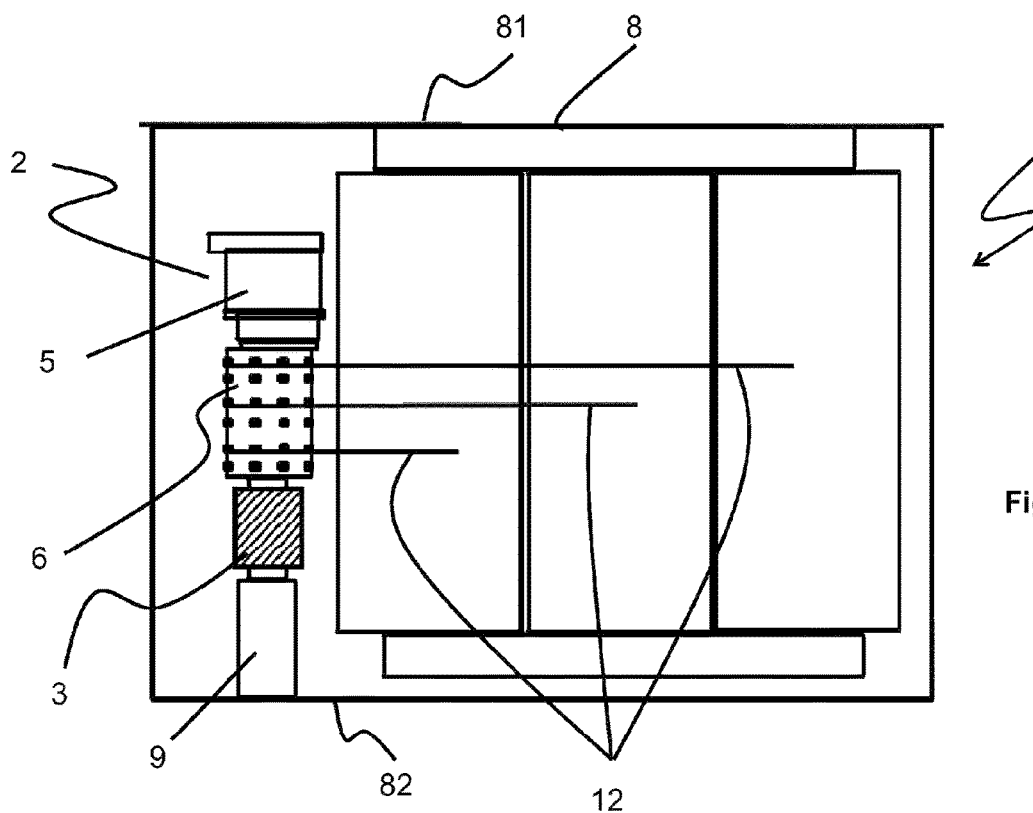
FIG. 7 shows a seventh embodiment of a tapped transformer with an on-load tap changer.

FIG. 7 shows a seventh embodiment in which the on-load tap changer 2 stands on an insulating foot 9 arranged at the lower part (base) of the transformer housing 8. In that case, the choke 3 is between the selector 6 and the insulating foot 9. Since the on-load tap changer 2 is no longer fastened by the load-changeover switch 5 to the upper part 81 of the transformer housing 8, this load-changeover switch 5 can be of particularly short construction.

Figure 8:
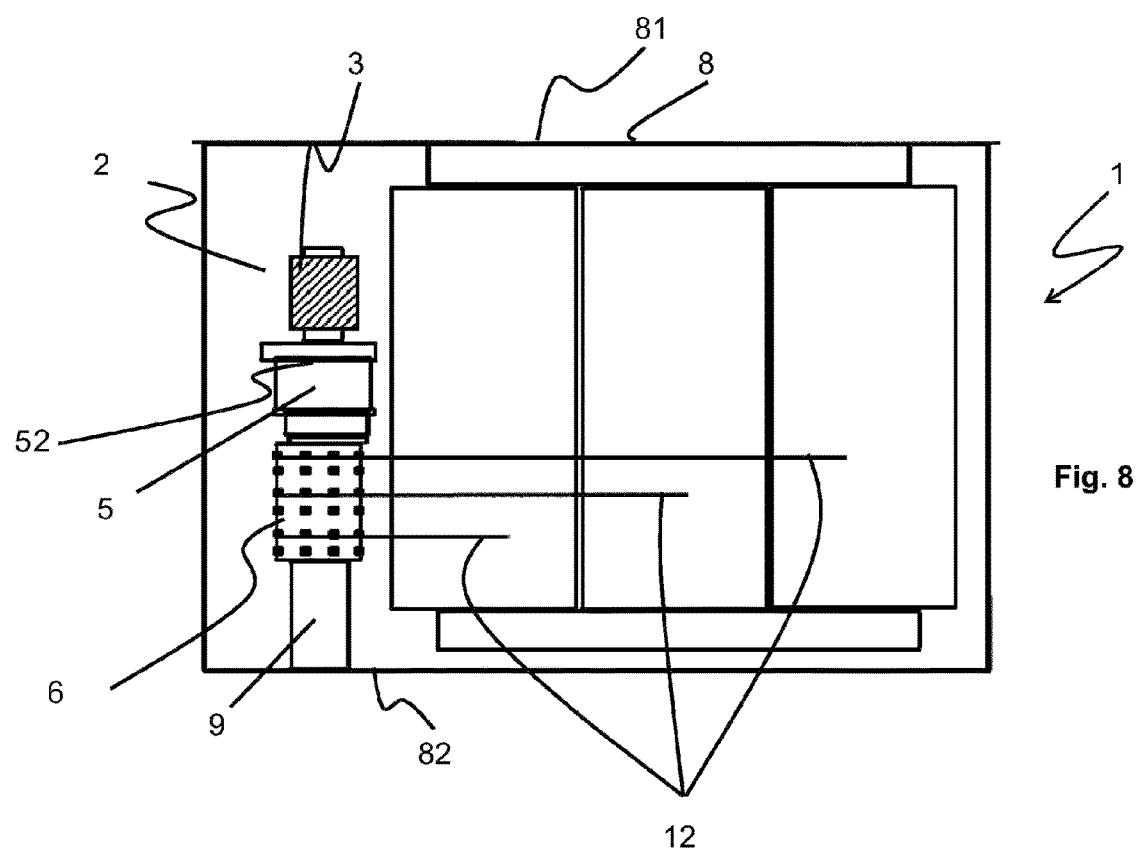
FIG. 8 shows an eighth embodiment of a tapped transformer with an on-load tap changer.

FIG. 8 shows an eighth embodiment in which the on-load tap changer 2 stands on an insulating foot 9 arranged at the lower part 82 (base) of the transformer housing 8. In that case, the choke 3 is on the load-changeover switch 5. Since the on-load tap changer 2 is no longer fastened by the load-changeover switch 5 to the upper part 81 of the transformer housing 8, this load-changeover switch 5 can be of particularly short construction.

Figure 9:
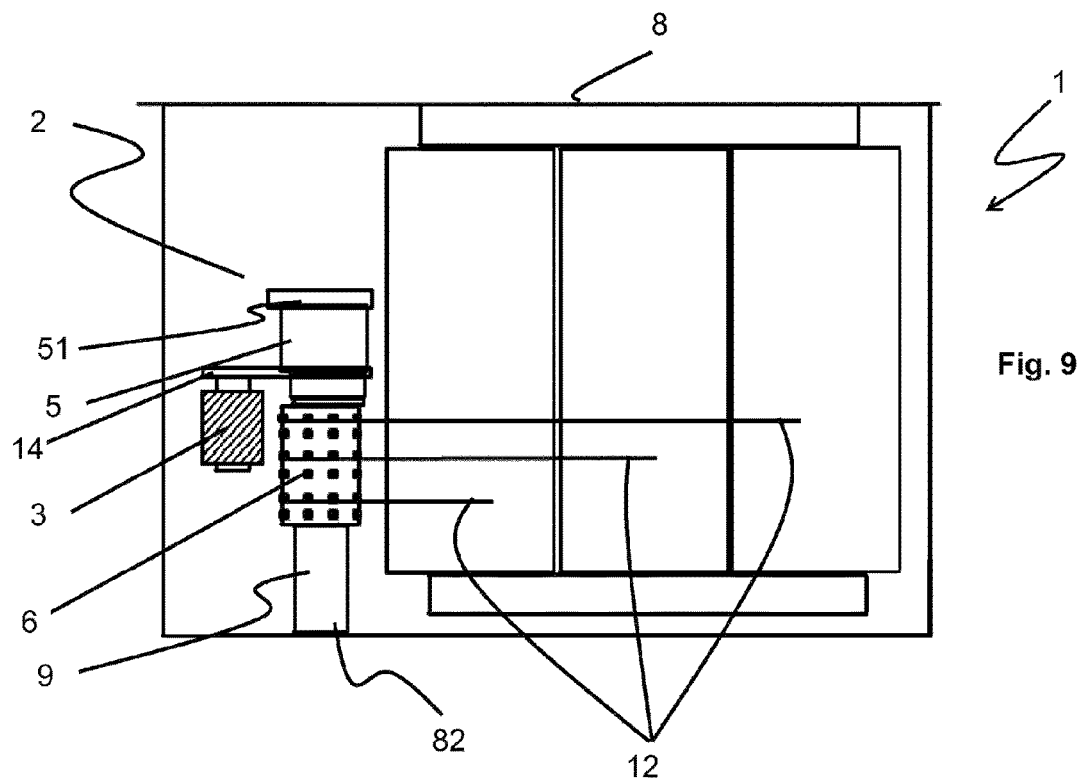
FIG. 9 shows a ninth embodiment of a tapped transformer with an on-load tap changer.

FIG. 9 shows a ninth embodiment in which the on-load tap changer 2 stands on an insulating foot 9 arranged at the lower part 82 (base) of the transformer housing 8. In that case the choke 3 is laterally by a support bracket 14 near the on-load tap changer 2. Since the on-load tap changer 2 is no longer fastened by the load-changeover switch 5 to the upper part 81 of the transformer housing 8, this load-changeover switch 5 can be of particularly short construction.

Figure 10:
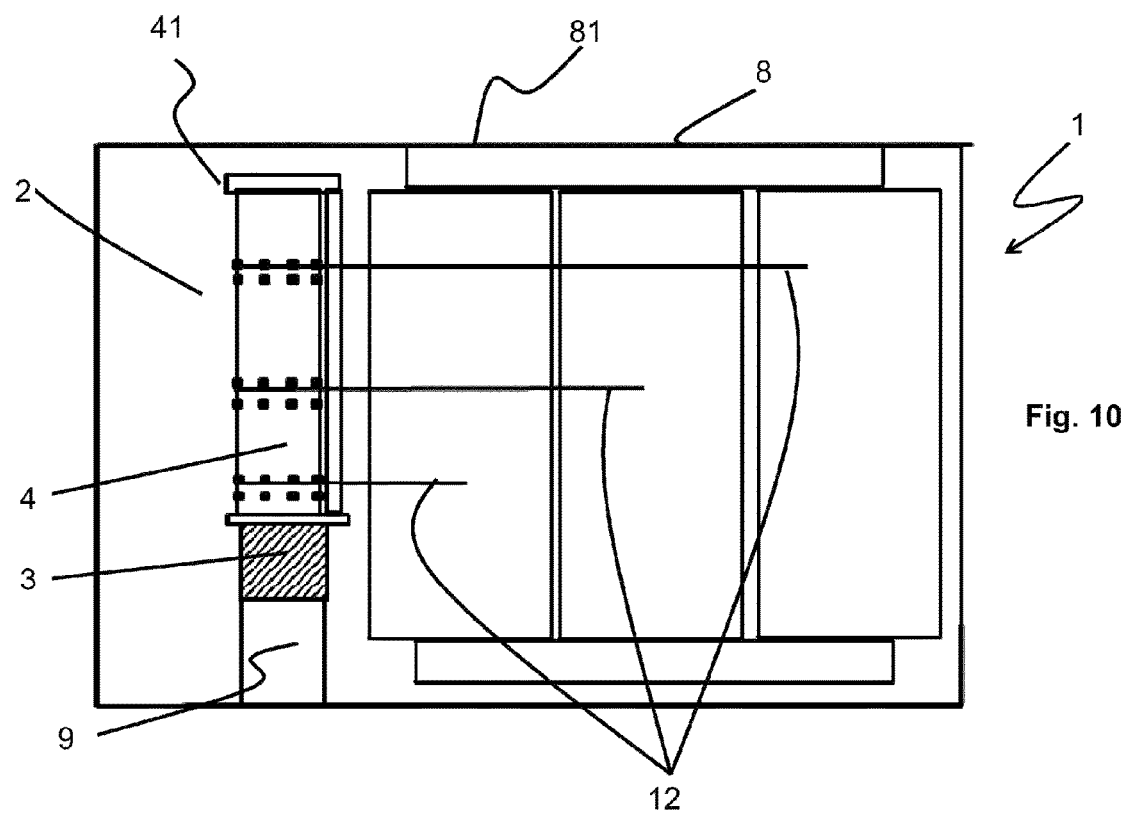
FIG. 10 shows a tenth embodiment of a tapped transformer with an on-load tap changer.

FIG. 10 shows a tenth embodiment in which the on-load tap changer 2 stands on an insulating foot 9 arranged at the lower part 82 (base) of the transformer housing 8. This is a load selector 4. In that case the choke 3 is between the load selector 4 and the insulating foot 9. However, this choke 3 can also be arranged at the upper end 41 of the load selector 4 (not illustrated here). Since the load selector 4 is no longer fastened to the upper part 81 of the transformer housing 8, the upper end 41 of the load selector 4 can be of particularly short construction.

Figure 11:
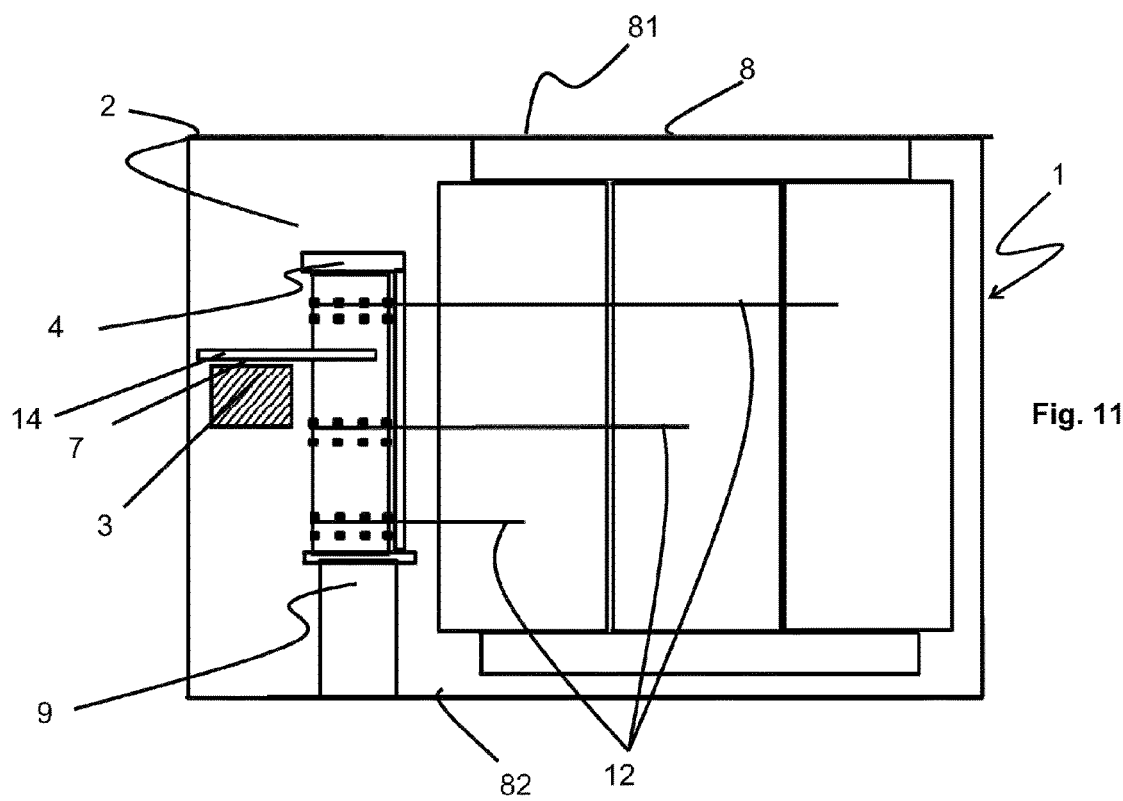
FIG. 11 shows an eleventh embodiment of a tapped transformer with an on-load tap changer.

FIG. 11 shows an eleventh embodiment in which the on-load tap changer 2 stands on an insulating foot 9 arranged at the lower part 82 (base) of the transformer housing 8. This is a load selector 4. In that case the choke 3 (in this instance three-phase) is laterally near the load selector 4 by a support bracket 14. Since the load selector 4 is no longer fastened to the upper part 81 of the transformer housing 8, the upper end 41 of the load selector 4 can be of particularly short construction.

Figure 12:
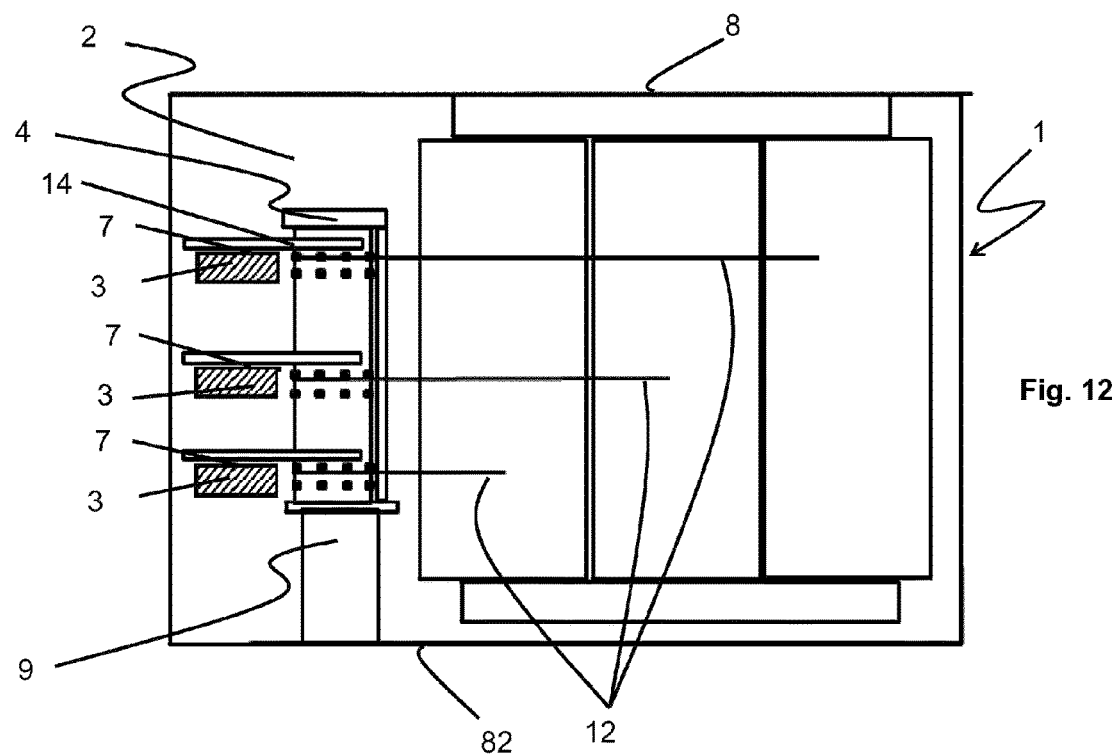
FIG. 12 shows a twelfth embodiment of a tapped transformer with an on-load tap changer.

FIG. 12 shows a twelfth embodiment in which the choke 3 comprises three separate (single-phase) windings and iron cores 7 that are directly on or by a respective support bracket 14 mounted laterally on the on-load tap changer 2. Since the load selector 4 is no longer fastened to the upper part 81 of the transformer housing 8, the upper end 41 of the load selector 4 can be of particularly short construction.

Figure 13:
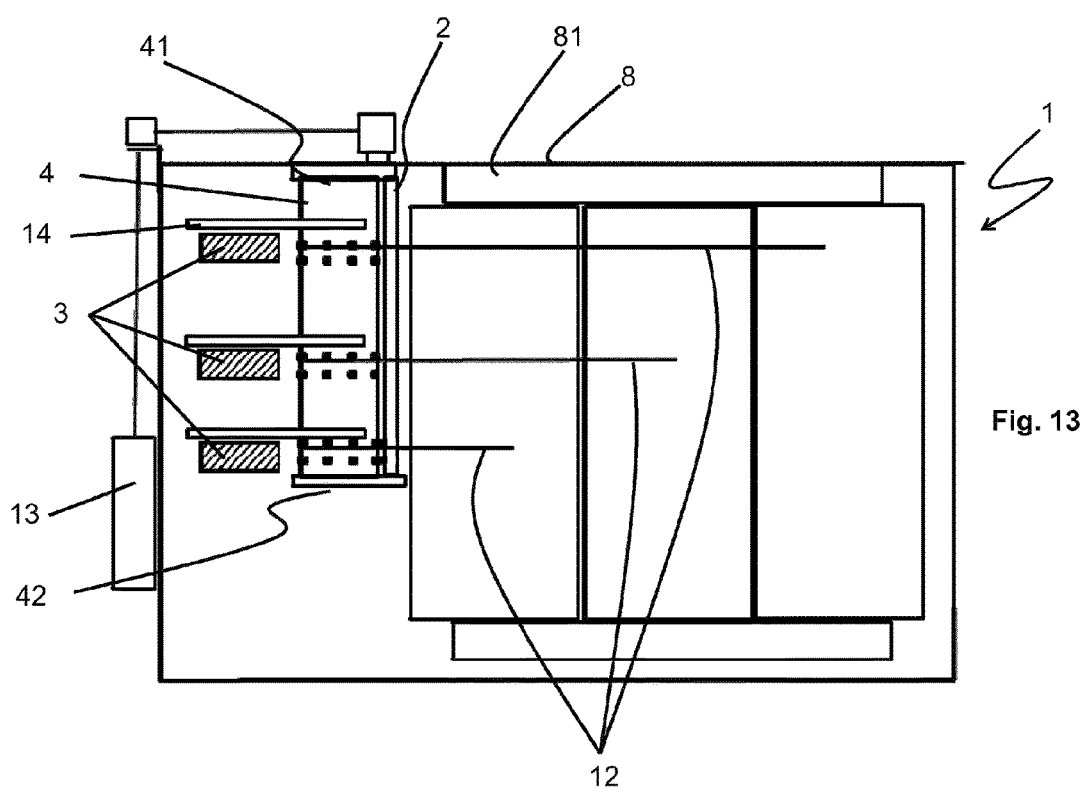
FIG. 13 shows a thirteenth embodiment of a tapped transformer with an on-load tap changer.

FIG. 13 shows a thirteenth embodiment in which three separate single-phase chokes 3 are directly on or by the respective support bracket 14 mounted laterally on the on-load tap changer 2.

The invention claimed is:

1. In an on-load tap changer according to the reactor switching principle for uninterrupted load switching of a phase between different winding taps of a tapped transformer, the improvement comprising:
a choke constructed as an inductive switching inductance for the phase, mounted on the on-load tap changer, and connected to and having the same voltage potential relative to ground as the on-load tap changer, the on-load tap changer being either a load selector or the combination of a tap selector with a load-changeover switch.

2. The on-load tap changer defined in claim 1, wherein, when the on-load tap changer is a load selector, the choke is mounted to an upper end or to a lower end of the load selector.

3. The on-load tap changer defined in claim 1, further comprising, when the on-load tap changer is a load-changeover switch and a tap selector, the choke is mounted to an upper end or to a lower end of the load-changeover switch or to an upper end or to a lower end of the tap selector.

4. The on-load tap changer defined in claim 3, further comprising:
an iron core extending through and between the load-changeover switch and the tap selector, the choke being mounted on the iron core between the load-changeover switch and the tap selector.

5. The on-load tap changer defined in claim 2, wherein the on-load tap changer is at an upper part of a transformer housing.

6. The on-load tap changer defined in claim 2, further comprising
an insulating foot at a lower part of a transformer housing and carrying the choke and the load selector.

* * * * *